United States Patent Office 3,644,574
Patented Feb. 22, 1972

3,644,574
SHAPED ARTICLES OF BLENDS OF POLYESTERS AND POLYVINYLS
Winston J. Jackson, Jr., Herbert F. Kuhfuss, and John R. Caldwell, Kingsport, Tenn., assignors to Eastman Kodak Company, Rochester, N.Y.
No Drawing. Filed July 17, 1969, Ser. No. 842,714
Int. Cl. C08f 29/10; C08g 39/10
U.S. Cl. 260—873
10 Claims

ABSTRACT OF THE DISCLOSURE

Blends of 1,4-butanediol polyesters such as derived from 1,4-butanediol and terephthalic or napthalenedicarboxylic acid, with vinyl aromatic polymers such as polystyrene give shaped articles having an excellent balance of physical properties.

---

This invention relates to improved polyester compositions and shaped articles therefrom. In particular, the invention concerns formable plastics consisting of 1,4-butanediol based polyesters of major amounts of terephthalic or naphthalenedicarboxylic acids blended with vinyl aromatic polymers.

Polyesters of 1,4-butanediol and terephthalic acid or naphthalenedicarboxylic acids may be used as molding plastics, but their impact strengths are limited. Moreover, the heat-distortion temperature of poly(tetramethylene terephthalate) is very low, and its use is thereby limited.

Objects, therefore, of the present invention are: to increase the impact strength and/or stiffness of these plastics; and to increase the stiffness and/or heat-distortion temperature and/or tensile strength of poly(tetramethylene terephthalate).

These and other objects hereinafter appearing have been attained in accordance with the present invention through the discovery that by blending the 1,4-butanediol polyesters with vinyl aromatic polymers and then forming or shaping articles therefrom, the articles exhibit a marked superiority in physical properties. In this regard it is noted that these improvements are not obtained when the polyester is poly(ethylene terephthalate) or poly(trimethylene terephthalate) and, consequently, it is very surprising that significant improvements are obtained with poly(tetramethylene terephthalate).

The polyesters of the present invention consist basically of the 1,4-butanediol polyesters of terephthalic acid and of naphthalenedicarboxylic acids. Of the naphthalenedicarboxylic acids, the 2,5-isomer is preferred, but other isomers, such as the 1,5- or 2,7-, also may be used. The polyesters are prepared by conventional techniques, such as by ester interchange of the glycol and a condensable derivative such as a dialkyl ester of the dicarboxylic acid or by esterification of the glycol and dicarboxylic acid. The polyester may be modified with up to about 20 mole percent of other glycols or dicarboxylic acids but, preferably, it is not modified. The inherent viscosities (i.V.) of the polymers are at least about 1.0 and preferably at least about 1.3 but may be up to about 2.5 as measured at a concentration of 0.25 g./100 ml. in 60/40 phenol/tetrachloroethane at 25° C.

A particularly preferred shaped article of the present invention is that comprising a blend of the polyester of 1,4-butanediol and terephthalic acid, and from about 5 to about 25% by weight of polystyrene, and having a heat distortion temperature of at least about 80° C.

Other glycols which may be employed include aliphatic of 2–20 carbons and alicyclic of 4–20 carbons, exemplified by: ethylene glycol; neopentyl glycol; 1,4-cyclohexanedimethanol; 1,10-decanediol; 1,4-cyclohexanediol; 2-ethyl-2-butyl-1,3-propanediol; and 1,6-hexanediol. Other dicarboxylic acids which may be employed include aliphatic of 2–20 carbons, alicyclic of 6–20 carbons, and aromatic of 8–16 carbons, as exemplified by isophthalic, azelaic, sebasic, adipic, dimethylmalonic, dodecanedicarboxylic, the isomeric cyclohexanedicarboxylic acids, sulfonyldibenzoic, diphenic, oxydibenzoic, and methylenedibenzoic acids.

The blends may contain from about 1 to about 40 weight percent and preferbaly from about 5 to about 25 weight percent, based on total blend weight, of the vinyl aromatic polymer which contains at least 50 weight percent of polymer units derived from at least one compound having the formula:

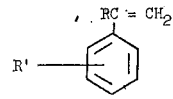

wherein R is hydrogen or an alkyl group containing 1 to 4 carbon atoms and R' is hydrogen or at least one member selected from the group consisting of chlorine, alkyl groups containing 1 to 4 carbon atoms, and phenyl. The vinyl aromatic polymer may be a copolymer, block polymer, graft polymer, or blend containing up to 50 wt. percent of polymer units derived from one or more of the following: olefins containing up to 8 carbon atoms (e.g., ethylene, propylene, butene, 4-methylpentene), butadiene, vinylnaphthalene, divinylbenzene, alkyl esters of acrylic and methacrylic acids wherein the alkyl groups contain from 1 to 4 carbons, acrylonitrile, methacrylonitrile, maleic anhydride, vinyl acetate, and other polymerizable compounds containing a —CH=C< group and which give copolymers which are stable under the forming conditions. Polystyrene is the preferred vinyl aromatic polymer.

Blending of the polyester with the vinyl aromatic polymer may be carried out by various well known procedures, including mechanical mixing of the particluate polymers, blending on hot rolls, mixing in the melt, mixing in solution and then removing the solvent, or mixing before or during preparation of the polyester itself. The preferred methods are to blend the two polymers in powder or granular form and extrude with a screw-type extruder, or mold the blend without prior extrusion. The latter method often gives higher impact strengths.

The blends may contain nucleating agents, fillers, pigments, glass fibers, antioxidants, stabilizers, plasticizers, lubricants, and other additives. Also known fire-retardant agents may be employed to impart flame resistance. The addition of antimony oxide in addition to halogen compounds also improves the fire resistance.

The polyesters are prepared by conventional procedures from the diol and preferably the dimethyl esters of the dicarboxylic acids. The vinyl aromatic polymers are prepared by conventional procedures from the corresponding monomers. The polymers are granulated to pass a 2-mm. screen, mechanically blended, dried in a vacuum oven at 100° C., and then extruded in a screwfed extruder (Plasti-Corder from C. W. Brabender Instruments, Inc., South Hackensack, N.J.) to form rods which are then cut into pellets of approximately ⅛ inch diameter. The pellets are dried in an oven at 100° C. overnight and injection-molded into unheated molds with a 1-oz., Watson-Stillman, injection-molding machine to give bars for testing. ASTM procedures are used for measuring the tensile strength and elongation (ASTM D1708), flexural modulus (ASTM D790), and Izod impact strength (ASTM D256 Method A). The heat-distortion temperature is the temperature at which 0.2% deflection of a 2-in. span of a ⅛-in. bar occurs at 264 p.s.i. as measured in a forced-convection oven as described in Modern Plastics, 34, No. 3, 169 (1965).

Table 1 lists the properties of injection-molded poly (tetramethylene terephthalate) (I.V. 1.38) blended with various amounts of polystyrene (Styron 686 from Dow Chemical Co.). Similar properties of the molded polyester blends are obtained with Dylene P3I (from Sinclair-Koppers Co.), which is an olefin-modified polystyrene. It is very surprising that only 15–25% polystyrene increases the heat-distortion temperature almost to that of polystyrene and, even more surprising, increases the impact strength instead of decreasing it.

TABLE 1

|  | Polystyrene content,[1] percent | | | | | |
| --- | --- | --- | --- | --- | --- | --- |
|  | 0 | 5 | 15 | 25 | 35 | 100 |
| Heat-distortion temp., ° C. | 54 | 64 | 81 | 85 | 87 | 88 |
| Tensile strength, p.s.i. | 7,100 | 7,200 | 7,200 | 8,100 | 8,600 | 10,300 |
| Elongation, percent | 157 | 86 | 48 | 37 | 16 | 15 |
| Flexural modulus, 10⁵ p.s.i. | 3.1 | 3.2 | 3.3 | 3.5 | 3.6 | 4.8 |
| Izod impact strength, ft.-lb./in. notch | 0.86 | 0.67 | 0.93 | 1.0 | 0.46 | 0.2 |

[1] In blends of poly(tetramethylene terephthalate) with an inherent viscosity of 1.38.

Table 2 lists the properties of some of the molded bars of Table 1 after further crystallization by annealing in an oven at 110° C. for 30 min. The tensile strength of the unblended polyester remains about 7100 p.s.i. whereas the blends have tensile strengths of about 8000 p.s.i. Impact strengths of the polymers (blended and unblended) are decreased only slightly. The heat-distortion temperatuure of the unblended polyester is increased only to 60° C. by annealing whereas appreciably higher values are obtained with the blends.

TABLE 2

|  | Polystyrene content,[1] percent | | | |
| --- | --- | --- | --- | --- |
|  | 0 | 5 | 15 | 25 |
| Heat-distortion temp., ° C. | 60 | 63 | 92 | 95 |
| Tensile strength, p.s.i. | 7,100 | 8,000 | 8,100 | 8,000 |
| Elongation, percent | 83 | 48 | 48 | 30 |
| Flexural modulus, 10⁵ p.s.i. | 2.9 | 3.0 | 3.4 | 3.7 |
| Izod impact strength, ft.-lb./in. notch | 0.75 | 0.67 | 0.62 | 0.96 |

[1] In blends of poly(tetramethylene terephthalate) (I.V. 1.38); molded bars are annelaed in an oven at 110° C. for 30 min. Similar properties can be obtained by molding the blends in hot (100 ° C.) molds.

Table 3 lists the properties of injection-molded poly (tetramethylene - 2,6 - naphthalenedicarboxylate) (I.V. 1.12) blended with polystyrene. Note the improved impact strength.

TABLE 3

|  | Poly(tetramethylene naphthalene-dicarboxylate) | |
| --- | --- | --- |
| Polystyrene content, percent | 0 | 15 |
| Heat-distortion temp., ° C. | 86 | 84 |
| Tensile strength, p.s.i. | 12,400 | 10,000 |
| Elongation, percent | 32 | 33 |
| Flexural modulus, 10⁵ p.s.i. | 2.6 | 2.9 |
| Izod impact strength, ft.-lb./in. notch | [1] 0.53 | 1.09 |

[1] When I.V. is 1.67 instead of 1.12, impact strength is 1.01 (1.86 when 15% polystyrene is also present).

The properties of poly(tetramethylene naphthalenedicarboxylate) are also improved when blends contain 30% polystyrene.

In contrast to poly(tetramethylene terephthalate), the overall molding plastic properties of poly(ethylene terephthalate) and poly(trimethylene terephthalate) are not improved by blending with polystyrene as shown in the table below.

TABLE 4

|  | Poly(ethylene-terephthalate)[1] | | Poly(trimethylene terephthalate)[2] | |
| --- | --- | --- | --- | --- |
| Polystyrene | 0 | 15 | 0 | 15 |
| Heat-distortion temp., ° C. | 79 | 81 | 71 | 58 |
| Tensile strength, p.s.i. | 8,500 | 8,600 | 7,400 | 7,800 |
| Elongation, percent | 480 | 98 | 236 | 15 |
| Flexural modulus, 10⁵ p.s.i. | 3.4 | 3.5 | 3.3 | 3.6 |
| Izod impact strength, ft.-lb./in. notch | 0.41 | 0.38 | 0.62 | 0.25 |

[1] I.V. 1.17.
[2] I.V. 1.63.

Table 5 lists the properties of blends of poly(tetramethylene terephthalate) (I.V. 1.60) containing 15% by weight of various polymers. In Examples 2–9 these polymers contain at least 50 wt. percent of a vinyl aromatic component, and in Examples 10–11 the polymers contain less than 50 wt. percent of a vinyl aromatic component. Note that the annealed samples of Examples 2–9 have appreciably higher heat-distortion temperatures than annealed samples of the control (Example 1) or of blends 10 and 11 containing little or none of the vinyl aromatic component.

When the particles are mechanically blended and molded without prior extrusion (e.g., Example 2a of Table 4), an appreciably higher impact strength is obtained.

The vinyl aromatic polymers of Examples 2–9 also improve the properties of the poly(tetramethylene naphthalenedicarboxylate) of Table 3.

TABLE 5

| Example | Polymer (15 wt. percent) with poly(tetramethylene terephthalate)[1] | Tensile strength, p.s.i. | Elongation, percent | Flexural modulus, 10⁵ p.s.i. | Izod impact strength, ft.-lb./in. notch | Heat-distortion temp. of bars, ° C. | |
| --- | --- | --- | --- | --- | --- | --- | --- |
|  |  |  |  |  |  | Unannealed | Annealed |
| 1 | None | 6,900 | 38 | 3.1 | 1.1 | 55 | 60 |
| 2 | Polystyrene | 8,200 | 36 | 3.5 | 1.3 | 69 | 94 |
| 2a | do.[3] | 7,300 | 16 | 3.2 | 2.2 | 78 | 90 |
| 3 | Poly(70/30 α-methylstyrene/styrene) | 7,800 | 40 | 3.1 | 1.4 | 92 | 103 |
| 4 | Poly(70/30 styrene/methyl methacrylate) | 7,700 | 75 | 3.4 | 0.7 | 69 | 78 |
| 5 | Poly(90/10 styrene/acrylonitrile) | 9,100 | 80 | 3.2 | 0.4 | 90 | 102 |
| 6 | Poly(80/20 p-chlorostyrene/isobutylene) | 7,400 | 71 | 3.2 | 1.3 | 60 | 86 |
| 7 | Poly(50/50 styrene/maleic anhydride) | 7,500 | 10 | 3.1 | 0.4 | 60 | 100 |
| 8 | Poly(dimethylstyrene) | 7,700 | 40 | 3.3 | 1.2 | 64 | 86 |
| 9 | ABS (25/25/50 acrylonitrile/butadiene/styrene) | 6,900 | 111 | 3.0 | 0.6 | 61 | 82 |
| 10 | Polyethylene | 3,700 | 20 | 1.9 | 1.9 | 54 | 55 |
| 11 | Poly(80/20 butadiene/styrene) | 5,700 | 30 | 2.5 | 1.1 | 60 | 60 |

[1] Inherent viscosity 1.60.
[2] Heated in an oven at 110° C. for 30 min.
[3] The mechanical blend is injection-molded without prior extrusion.

When the 85/15 blend of poly(tetramethylene terephthalate) and polystyrene of Table 5, Example 2, is mixed with 20 wt. percent of 0.25-in. glass fibers and injection-molded into a hot mold at 100° C., the following properties are obtained: tensile strength 14,500 p.s.i., elongation 4%, flexural modulus $8.6 \times 10^5$ p.s.i., Izod impact strength 2.8 ft.-lbs./in. notch, heat distortion temperature 231° C. The remarkable improvement in properties obtained with the glass fibers is apparent. Similar improvement is obtained with other blends in Examples 3–9 of Table 5 containing 10–30 weight percent of glass fibers and with similar blends prepared with poly(tetramethylene 2,6-naphthalenedicarboxylate) as the polyester.

A copolyester (I.V. 1.82) is prepared from 1,4-butanediol 85 mole percent of dimethyl terephthalate, and 15 mole percent of dimethyl isophthalate. Table 6 shows the improvement in properties obtained when the polyester is blended with 15% polystyrene.

TABLE 6

|  | Unannealed |  | Annealed [1] |  |
|---|---|---|---|---|
| Polystyrene content, percent | 0 | 15 | 0 | 15 |
| Heat-distortion temp., ° C | 44 | 45 | 44 | 84 |
| Tensile strength, p.s.i | 4,100 | 5,100 | 4,500 | 5,500 |
| Elongation, percent | 227 | 359 | 110 | 90 |
| Flexural modulus, $10^5$ p.s.i | 1.5 | 2.0 | 1.7 | 2.2 |
| Izod impact strength, ft. lb./in. notch | 1.05 | 1.33 | 0.90 | 1.16 |

[1] Heated in an oven at 110° C. for 30 min.

A similar improvement in properties is obtained when 20 wt. percent of polystyrene is blended with a copolyester prepared from 1,4-butanediol, 10 mole percent of dimethyl azelate, and 90 mole percent of either dimethyl terephthalate (polymer I.V. 1.39) or dimethyl 2,6-naphthalenedicarboxylate (polymer I.V. 1.32). The properties also are similarly improved when 15 wt. percent of polystyrene is blended with a copolyester (I.V. 1.41) prepared from dimethyl terephthalate, 1,4-butanediol, and ethylene glycol and containing a 9:1 ratio of butanediol/ethylene glycol units.

This invention has been described in detail with particular reference to preferred embodiments thereof, but it will be understood that variations and modifications can be effected within the spirit and scope of the invention as described hereinabove.

What is claimed is:

1. A shaped article of a blend comprising a linear polyester of at least about 80 mole percent of 1,4-butanediol and at least about 80 mole percent of terephthalic acid or a naphthalenedicarboxylic acid, or derivatives thereof, having an inherent viscosity of from about 1.0 to about 2.5 as measured at 25° C. using 0.25 g. of polyester per 100 ml. of a solvent consisting of 60 percent by weight phenol and 40 percent by weight tetrachloroethane, and from about 1 to about 40 weight percent based on total blend weight of at least one vinyl aromatic polymer component containing at least about 50 weight percent of polymer units of at least one compound having the formula

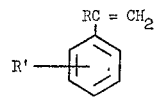

wherein R is hydrogen or an alkyl group containing 1 to 4 carbon atoms and R' is hydrogen or at least one member selected from the group consisting of chlorine, alkyl groups containing 1 to 4 carbon atoms, and phenyl, the remainder of said vinyl aromatic polymer component being polymer units of at least one monomer selected from the group consisting of monoolefins of 2 to 8 carbons, butadiene, vinyl naphthalene, divinylbenzene, alkyl esters of acrylic and methacrylic acids wherein the alkyl groups contain from 1–4 carbons, acrylonitrile, methacrylonitrile, maleic anhydride, and vinyl acetate.

2. The shaped article of claim 1 wherein the vinyl aromatic polymer component is comprised solely of repeating polymer units of at least one compound having the formula

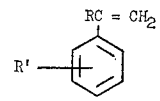

wherein R is hydrogen or an alkyl group containing 1 to 4 carbon atoms and R' is hydrogen or at least one member selected from the group consisting of chlorine, alkyl groups containing 1 to 4 carbon atoms, and phenyl.

3. The shaped article of claim 1 wherein the vinyl aromatic polymer component is polystyrene.

4. The shaped article of claim 1 in the form of an extruded rod.

5. The shaped article of claim 1 in the form of a pellet.

6. The shaped article of claim 1 wherein the polyester is derived from 1,4-butanediol and terephthalic acid.

7. The shaped article of claim 1 wherein the polyester is derived from 1,4-butanediol and 2,6-naphthalenedicarboxylic acid.

8. The shaped article of claim 6 wherein the vinyl aromatic polymer component is polystyrene.

9. The shaped article of claim 8 wherein the polystyrene comprises from about 5 to about 25% by weight of the blend.

10. The shaped article of claim 9 having a heat distortion temperature of at least about 80° C.

References Cited

UNITED STATES PATENTS 3,239,582 3/1966 Keskkula et al. _____ 260—873
3,461,186 8/1969 Galiano et al. _____ 260—873

FOREIGN PATENTS 854,475 11/1960 Great Britain _____ 260—873

WILLIAM H. SHORT, Primary Examiner

E. WOODBERRY, Assistant Examiner

PO-1050
(5/69)

UNITED STATES PATENT OFFICE
CERTIFICATE OF CORRECTION

Patent No. 3,644,574          Dated February 22, 1972

Inventor(s) Winston J. Jackson, Jr.; Herbert F. Kuhfuss; John R. Caldwell

It is certified that error appears in the above-identified patent and that said Letters Patent are hereby corrected as shown below:

Column 1, line 59, delete "(i.V.)" and insert ---(I.V.)---.

Column 2, line 17, delete "preferbaly" and insert ---preferably---.

Column 3, line 14, delete "(1965)" and insert ---(1956)---.

Column 3, Table 1, Izod impact strength, ft.-lb./in. notch under "100", delete "0.2" and insert ---0.24---.

Column 3, Table 2, Flexural modulus, $10^5$ p.s.i., under "25", delete "3.7" and insert ---3.6---.

Column 3, Table 2, Izod impact strength, ft.-lb./in. notch under "25", delete "0.96" and insert ---0.97---.

Column 3, Table 2, second line under $^1$, delete "annelaed" and insert ---annealed---.

Column 4, Table 3, Izod impact strength, ft.-lb./in. notch, second column, delete "1.09" and insert ---1.06---.

Column 4, Table 5, after "Annealed" in the heading, insert ---$^2$---.

Column 4, Table 5, Example 11 under "Flexural Modulus $10^5$ p.s.i.", delete "2.5" and insert ---2.6---.

Signed and sealed this 19th day of September 1972.

(SEAL)
Attest:

EDWARD M. FLETCHER, JR.
Attesting Officer

ROBERT GOTTSCHALK
Commissioner of Patents